US008676500B1

(12) United States Patent
Walsh

(10) Patent No.: US 8,676,500 B1
(45) Date of Patent: Mar. 18, 2014

(54) METHOD OF PROVIDING INTERSECTION ASSISTANCE AND RELATED PORTABLE ELECTRONIC DEVICE

(75) Inventor: Geoff Walsh, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 0 days.

(21) Appl. No.: 13/600,200

(22) Filed: Aug. 30, 2012

(51) Int. Cl.
*G06F 19/00* (2011.01)
*G08G 1/0967* (2006.01)
*G06Q 50/26* (2012.01)
*G06Q 50/30* (2012.01)

(52) U.S. Cl.
CPC .... *G08G 1/096716* (2013.01); *G08G 1/096775* (2013.01); *G08G 1/096758* (2013.01); *G06Q 50/26* (2013.01); *G06Q 50/30* (2013.01); *Y10S 706/905* (2013.01)
USPC .................. 701/437; 701/1; 701/45; 701/70; 701/120; 701/434; 379/14; 379/15.01; 379/112.01; 379/112.06; 379/112.07; 709/206; 709/220; 709/223; 709/224; 709/227; 370/329; 370/352; 370/358; 370/395.21; 370/401; 455/62; 455/452.2; 703/6; 703/8; 706/905; 726/11

(58) Field of Classification Search
CPC .................. G08G 1/096716; G08G 1/096775; G08G 1/096758; G06Q 50/26; G06Q 50/30
USPC ........... 701/1, 30, 45, 70, 120, 434, 435, 436, 701/532, 533, 117; 379/14, 15.01, 112.01, 379/112.06, 112.07, 112.09, 224; 709/206, 709/220, 223, 224, 227, 229, 245, 249; 370/358, 329, 252, 395.21, 401; 455/62, 452.2, 456.3; 703/6, 8; 706/902; 1/1; 726/11; 340/907, 932
See application file for complete search history.

(56) References Cited

U.S. PATENT DOCUMENTS

| | | | | |
|---|---|---|---|---|
| 6,317,085 B1 * | 11/2001 | Sandhu et al. | ................ | 343/702 |
| 6,381,534 B2 * | 4/2002 | Takayama et al. | ............ | 701/465 |
| 6,442,473 B1 * | 8/2002 | Berstis et al. | ................ | 701/117 |
| 6,502,032 B1 * | 12/2002 | Newman | ....................... | 701/487 |
| 7,663,505 B2 * | 2/2010 | Publicover | .................... | 340/932 |
| 8,027,762 B2 * | 9/2011 | Otake et al. | ...................... | 701/23 |
| 2001/0013837 A1 | 8/2001 | Yamashita et al. | | |
| 2004/0102898 A1 * | 5/2004 | Yokota et al. | ................ | 701/210 |

(Continued)

FOREIGN PATENT DOCUMENTS

| | | |
|---|---|---|
| DE | 10 2010 043 696 A1 | 5/2012 |
| JP | H03211412 | 9/1991 |
| JP | 2008122281 A | 5/2008 |
| JP | 2012137371 A | 7/2012 |

*Primary Examiner* — McDieunel Marc
(74) *Attorney, Agent, or Firm* — Winston Hsu; Scott Margo

(57) ABSTRACT

A method of providing intersection assistance with a portable electronic device to remind a user of traffic rules when the user approaches traffic intersections includes receiving an input from the user indicating a destination location for generating navigation instructions to the destination location, determining a current location of the portable electronic device according to received position signals, providing navigation instructions to the destination location according to the current location of the portable electronic device, and reminding the user of traffic rules related to intersections for a geographical location in which the portable electronic device is currently located when the portable electronic device detects that the portable electronic device is approaching an intersection, where reminding the user of traffic rules related to intersections comprises indicating a side of a second road the user should turn onto when making a turn from a first road onto the second road.

16 Claims, 8 Drawing Sheets

(56) References Cited

U.S. PATENT DOCUMENTS

| | | | | |
|---|---|---|---|---|
| 2005/0231384 | A1* | 10/2005 | Shimotani | 340/903 |
| 2006/0220905 | A1* | 10/2006 | Hovestadt | 340/901 |
| 2008/0012726 | A1* | 1/2008 | Publicover | 340/932 |
| 2008/0059055 | A1* | 3/2008 | Geelen et al. | 701/201 |
| 2009/0177388 | A1 | 7/2009 | Schmidt | |
| 2010/0094544 | A1* | 4/2010 | Hess et al. | 701/208 |
| 2012/0265435 | A1* | 10/2012 | Yu et al. | 701/423 |

* cited by examiner

METHOD OF PROVIDING INTERSECTION ASSISTANCE AND RELATED PORTABLE ELECTRONIC DEVICE

BACKGROUND OF THE INVENTION

1. Field of the Invention

The invention relates to providing intersection assistance to remind users of traffic rules, and more particularly, to using a portable electronic device to provide intersection assistance in order to remind users of traffic rules pertaining to a current geographical location when the users approach a traffic intersection.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Personal navigation devices strive to guide users on the best possible route in order to minimize the time needed to travel from one point to another. However with people traveling internationally now more than ever, providing navigation instructions with a navigation device is not always sufficient for helping the users to familiarize themselves with the traffic rules of a foreign country. When travelling abroad, traffic rules that exist in some countries can be quite different from the traffic rules in other countries. This can cause confusion for people visiting and driving in a different country, especially those that travel frequently or are first time visitors. In fact, traffic rules may even vary regionally within a country, such as in metropolitan areas like New York City, N.Y., in the United States of America.

While not knowing traffic rules can end up causing users to waste time unnecessarily in certain instances, it can be dangerous or deadly in other instances. For example, when travelling to a country that drives on the opposite side of the road, it is possible and quite easy for drivers to get mixed up on which side of the road to travel on when turning at intersections.

Therefore, there exists a need for reminding users about the traffic rules of a current geographical location when the users approach a traffic intersection.

SUMMARY OF THE INVENTION

It is therefore one of the primary objectives of the claimed invention to disclose a method of providing intersection assistance with a portable electronic device to remind a user of traffic rules when the user approaches traffic intersections, and a related portable electronic device.

According to an exemplary embodiment of the claimed invention, a method of providing intersection assistance with a portable electronic device to remind a user of traffic rules when the user approaches traffic intersections is disclosed. The method includes receiving an input from the user indicating a destination location for generating navigation instructions to the destination location, determining a current location of the portable electronic device according to received position signals, providing navigation instructions to the destination location with the portable electronic device according to the current location of the portable electronic device, and reminding the user of traffic rules related to intersections for a geographical location in which the portable electronic device is currently located when the portable electronic device detects that the portable electronic device is approaching an intersection, where reminding the user of traffic rules related to intersections comprises indicating a side of a second road the user should turn onto when making a turn from a first road onto the second road.

According to another exemplary embodiment of the claimed invention, a portable electronic device for providing intersection assistance with a portable electronic device to remind a user of traffic rules when the user approaches traffic intersections is disclosed. The portable electronic device includes a position receiving device receiving position signals indicating a current location of the portable electronic device, a map database for storing map data including road information, route software for receiving a destination location from the user and providing navigation instructions to the destination location with the portable electronic device according to the current location of the portable electronic device, and a user interface for reminding the user of traffic rules related to intersections for a geographical location in which the portable electronic device is currently located when the portable electronic device detects that the portable electronic device is approaching an intersection, where the user interface reminds the user of traffic rules related to intersections by indicating a side of a second road the user should turn onto when making a turn from a first road onto the second road.

It is an advantage that the present invention reminds users of the traffic rules pertaining to the current geographical location where the user is located. In this way, the user can travel through traffic intersections more safely, while also causing fewer hindrances for other drivers on the road. As most of the different driving rules are encountered when a user comes to a traffic intersection, the present invention reminds the user of the traffic rules for the current geographical location when the user approaches the intersection. In this way, intersection assistance can not only be customized according to the geographical location where the user is located, but intersection assistance can also be customized according to the characteristics of specific types of traffic intersections encountered by the user of the portable electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
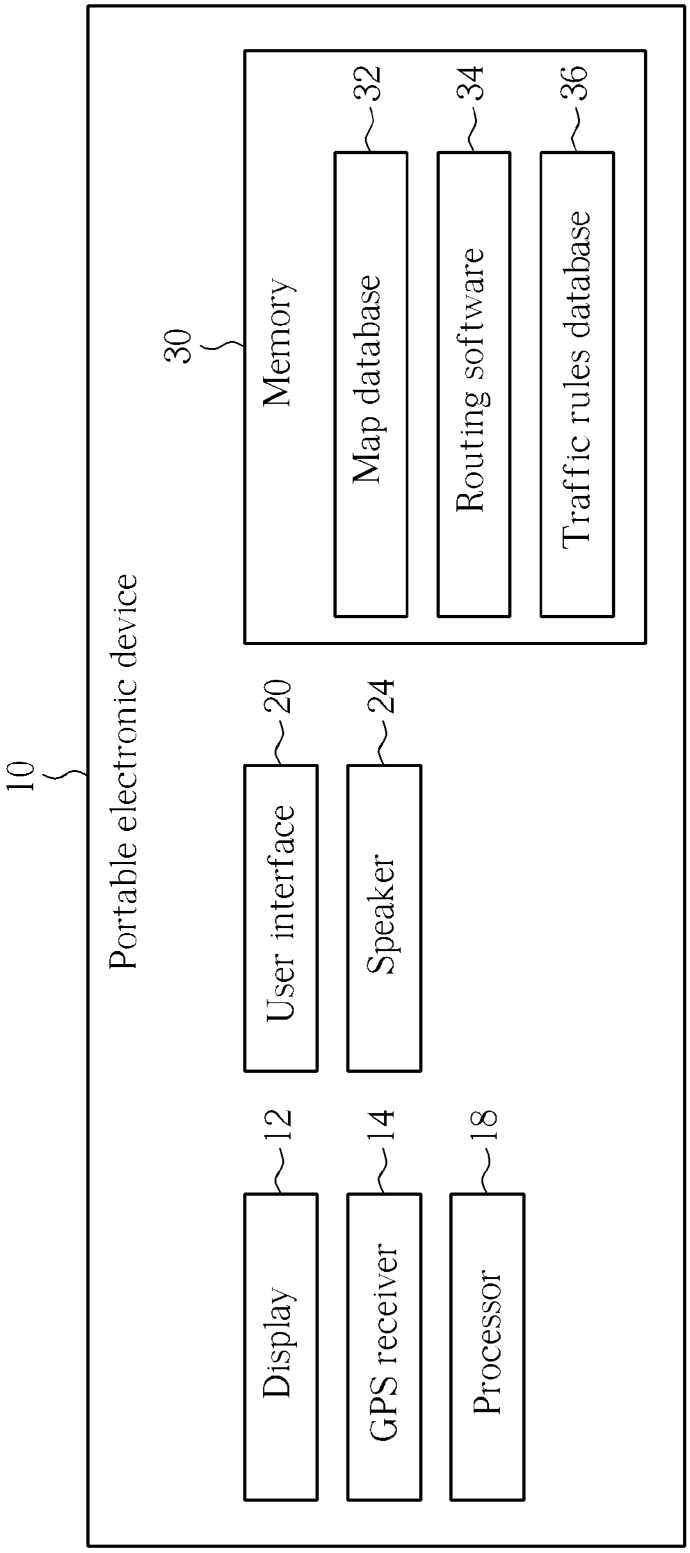
FIG. 1 is a functional block diagram of a portable electronic device according to the present invention.

Please refer to FIG. 1. FIG. 1 is a block diagram of a portable electronic device 10 according to the present invention. The portable electronic device 10 contains a display 12 which can be a touch sensitive display, a Global Positioning System (GPS) receiver 14 for receiving the current coordinates of the portable electronic device 10, a processor 18 for controlling operation of the portable electronic device 10, a user interface 20, a speaker 24, and a memory 30. The memory 30 is used to store a map database 32 containing map data and road information. The memory 30 also stores routing software 34 as well as a traffic rules database 36 that maintains a list of traffic rules for various geographical locations. For instance the traffic rules database 36 can store traffic rules pertaining to various countries for which the user has bought or subscribed to maps in the map database 32. As many countries have similar traffic rules, the traffic rules database 36 can be simplified by associating the same traffic rules with a variety of counties.

When the user requests navigation assistance to a destination location, the routing software 34 will generate a suggested route for the user to follow and will provide navigation instructions to the user along the way such as indicating which way the user should turn and which lane of a road the user should get in. If the routing software 34 generates two or more suggested routes, then the user can have the opportunity to select which one of the suggested routes the user would like to receive navigation instructions for.

The GPS receiver 14 receives GPS signals and indicates a current location of the portable electronic device 10. Please note that other satellite or terrestrial position receiving devices besides the GPS receiver 14 could be used instead for receiving position signals. When creating the suggested route for the user to follow, the routing software 34 determines which intersections will be visited along the suggested route, and the user interface 20 will provide intersection assistance for some or all of these intersections. When the GPS receiver 14 indicates that portable electronic device 10 is approaching an intersection, the user interface 20 of the portable electronic device 10 generates a reminder using the traffic rules stored in the traffic rules database 36 for reminding the user about the traffic rules of that particular intersection. Not only can traffic rules for specific intersections be stored in the traffic rules database 36, but also traffic rules for different countries or regions are stored in the traffic rules database 36.

One example of a traffic rule that differs in different countries is how right turns on red lights are handled in countries that drive on the right-hand side of the road, and how left turns on red lights are handled in countries that drive on the left-hand side of the road. For example, if a driver from the European Union, Australia, or New Zealand is driving in the United States of America (USA) or in Canada, the driver may not be aware that traffic rules in the USA and Canada usually permit turning right on a red light so long as the driver yields to traffic approaching from the left. When a right turn on a red light is permitted, this information is not usually posted on a sign. In fact, a sign is often only posted when a right turn on a red light is not permitted. In contrast, a driver in New Zealand would only be able to make a turn (in this case a left turn) on a red light if, and only if, there is a sign posted indicating that a left turn on a red light is permitted. Therefore, to help avoid confusion, the present invention offers intersection assistance to inform drivers of the traffic rules when the drivers approach intersections. In each of the following examples, it will be assumed that a user is traveling in the USA. Intersection assistance, therefore, would be very helpful for users coming from countries where vehicles are driven on the left-hand side of the road or where traffic rules differ greatly from traffic rules of the USA.

Figure 2:
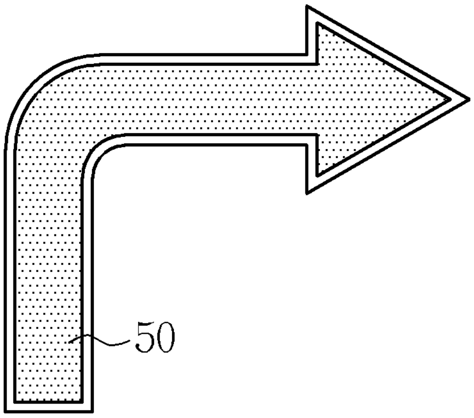
FIG. 2 is an example of existing traffic guidance for a right turn.
Figure 3:
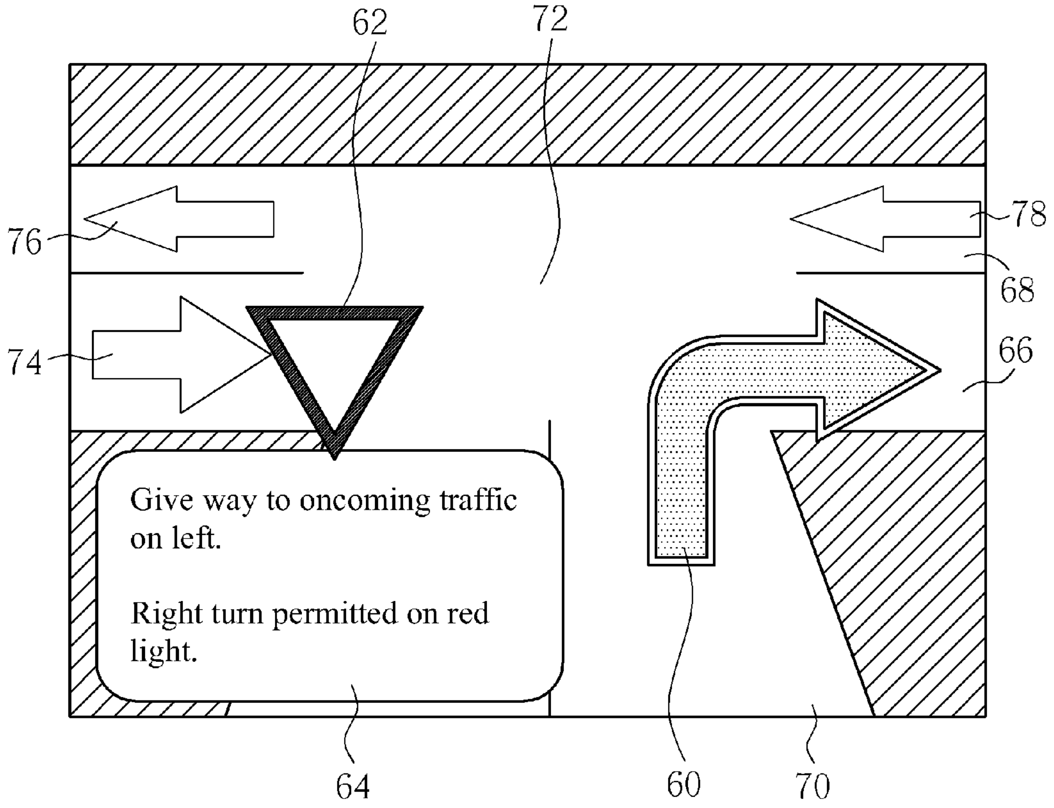
FIG. 3 is an example of intersection assistance for making a right turn according to the present invention.

Please refer to FIG. 2 and FIG. 3. FIG. 2 is an example of existing traffic guidance for a right turn. As shown in FIG. 2, a right arrow 50 indicates to a user of the portable electronic device 10 that a right turn should be made up ahead. FIG. 3 is an example of intersection assistance for making a right turn according to the present invention. In the present invention, the user interface 20 displays intersection assistance in order to more clearly guide the user as it approaches an intersection. Since the suggested route generated by the routing software 34 indicates that a right turn is to be made at an intersection with a traffic light, the user interface 20 displays a right arrow 60 along with a both a yield symbol 62 and a notice 64. The notice 64 is a text description, and states "Give way to oncoming traffic on left. Right turn permitted on red light." The yield symbol 62 also provides an additional visual clue to the user of the portable electronic device 10 that the user must yield to oncoming traffic before turning right. In general, the yield symbol 62 or any other symbol provides a visual clue to the user regarding a driving maneuver needed at an upcoming intersection.

Furthermore, a first road 70 which the user is currently traveling on and a second road 72 which the user will turn onto are shown. Notably, lanes 66 and 68 of the second road 72 are also shown, with arrows 74, 76, and 78 indicating which way traffic is flowing on the lanes 66 and 68. Therefore, not only does the user interface 20 display the notice 64 and the right arrow 60, but the user interface 20 also indicates which side of the second road 72 the user should turn onto, as well as the lane 66 of the second road 72 that the user should use. In this way, a user from a country where vehicles travel on the left-hand side of the road can avoid turning onto the wrong side of road 72, thereby avoiding a serious collision with oncoming traffic in lane 68. The present invention method of offering intersection assistance can therefore help a user to become familiar with the traffic rules of the current location where the user is driving.

As another example of a situation in which a driver may require intersection assistance, making a simple turn from one road to another can become a complicated task if a driver is used to driving on the opposite side of the road from the country that the driver is now visiting. Assume a driver from New Zealand, where vehicles drive on the left-hand side of the road, is visiting the USA, where vehicles drive on the right-hand side of the road. When the driver approaches an intersection and wishes to turn either left or right, if the driver is distracted or thoughts or conversation, the driver can easily turn onto the wrong side of the road. If the road happens to have a median barrier separating the two sides of the road, then the driver will not be able to easily correct a mistake involving turning onto the wrong side of the road.

Figure 4:
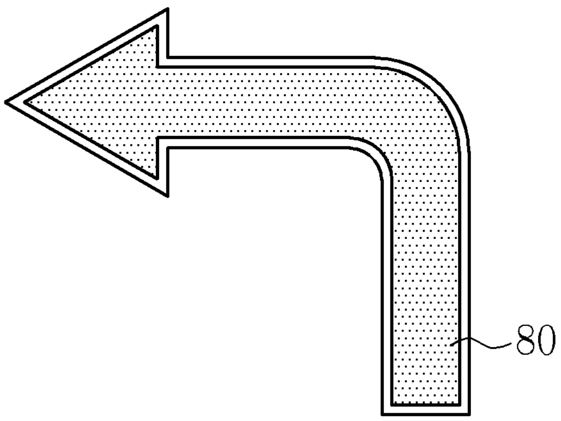
FIG. 4 is an example of existing traffic guidance for a left turn.
Figure 5:
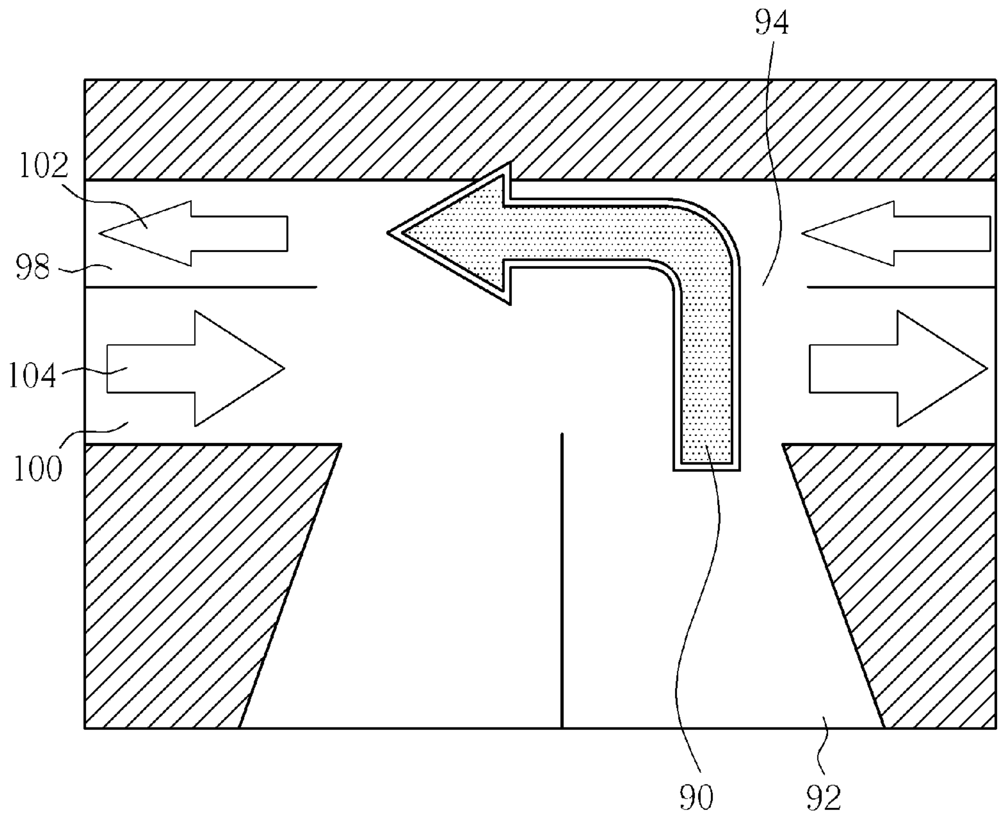
FIG. 5 is an example of intersection assistance for making a left turn according to the present invention.

Please refer to FIG. 4 and FIG. 5. FIG. 4 is an example of existing traffic guidance for a left turn. As shown in FIG. 4, a left arrow 80 indicates to a user of the portable electronic device 10 that a left turn should be made up ahead. FIG. 5 is an example of intersection assistance for making a left turn according to the present invention. Since the suggested route generated by the routing software 34 indicates that a left turn is to be made up ahead, the user interface 20 displays a left arrow 90. Furthermore, a first road 92 which the user is currently traveling on and a second road 94 which the user will turn onto are shown. Lanes 98 and 100 of the second road 94 are also shown, with arrows 102 and 104 indicating which way traffic is flowing on the lanes 98 and 100. Therefore, not only does the user interface 20 display the left arrow 90, but the user interface 20 also indicates which side of the second road 94 the user should turn onto, as well as the lane 98 of the second road 94 that the user should use. In this way, a user from a country where vehicles travel on the left-hand side of the road can avoid turning onto the wrong side of road 94, thereby avoiding a serious collision with oncoming traffic in lane 100.

In the USA, four-way stops or all-way stops are commonly seen at intersections that are not busy enough to warrant a traffic light. However, drivers from countries that do not have four-way stops may not be familiar with the driving rules associated with four-way stops. It may not be clear to the driver who the driver should give way to, and this may cause the driver unnecessary confusion which could slow down the driver or even lead to a collision.

Figure 6:
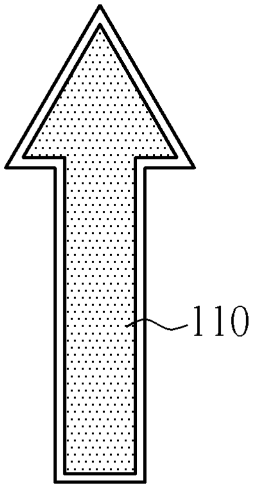
FIG. 6 is an example of existing traffic guidance through a four-way stop.
Figure 7:
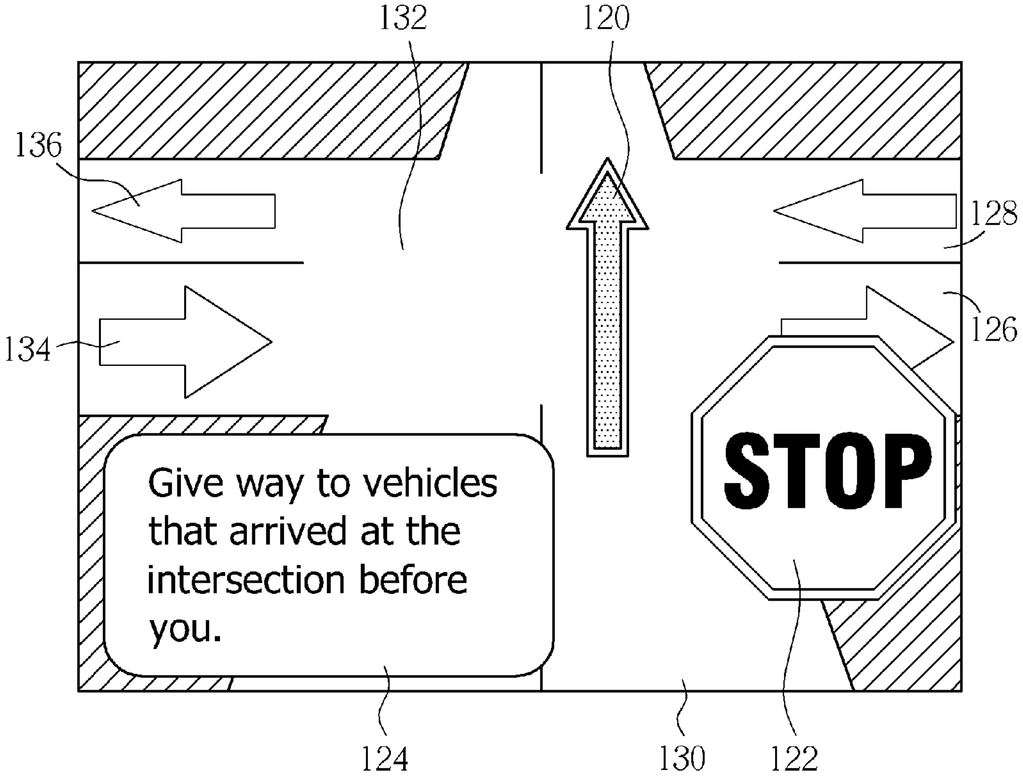
FIG. 7 is an example of intersection assistance for driving straight when passing through a four-way stop according to the present invention.

Please refer to FIG. 6 and FIG. 7. FIG. 6 is an example of existing traffic guidance through a four-way stop. As shown in FIG. 6, a straight arrow 110 indicates to a user of the portable electronic device 10 that the driver should drive straight when passing through the intersection up ahead. FIG. 7 is an example of intersection assistance for driving straight when passing through a four-way stop according to the present invention. Since the suggested route generated by the routing software 34 indicates that the user is to drive straight at the intersection with a four-way stop, the user interface 20 displays a straight arrow 120 along with a both a stop symbol 122 and a notice 124. The notice 124 is a text description, and states "Give way to vehicles that arrived at the intersection before you." The stop symbol 122 also provides an additional visual clue to the user of the portable electronic device 10 that the user must stop at the intersection before continuing to drive straight. Furthermore, a first road 130 which the user is currently traveling on and a second road 132 which the user will turn onto are shown. Lanes 126 and 128 of the second road 132 are also shown, with arrows 134 and 136 indicating which way traffic is flowing on the lanes 126 and 128, respectively. In this way, a user from a country where four-way stops are not common will know the traffic rules associated with four-way stops.

Figure 8:
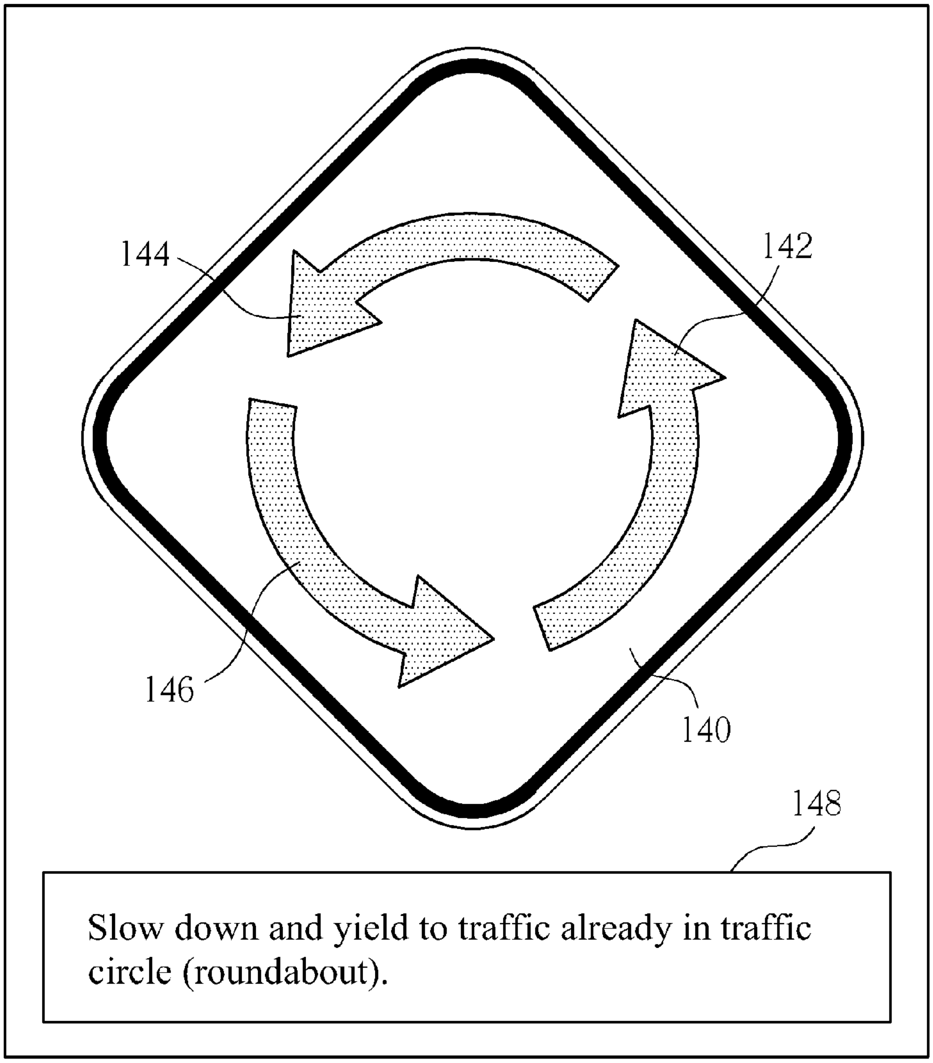
FIG. 8 shows a sign indicating the directions for a roundabout as displayed on the user interface for providing intersection assistance through the roundabout.

When traveling to a different country or a different region of the same country, there may be intersection types that are not known to visiting drivers. For instance, in Australia, a hook turn requires a driver to turn right from the left lane of traffic. Similarly, in many countries a roundabout, also known in the USA as a traffic circle, is used to allow cars to pass through intersections without having to stop for a stop sign or a traffic light. However, the roundabout may be unfamiliar for many drivers coming from places that do not use roundabouts. As a result, the user interface 20 of the present invention can help guide users though roundabouts or other non-typical intersections. As shown in FIG. 8, a sign 140 indicating the directions for a roundabout can be displayed on the user interface 20 for providing intersection assistance through the roundabout. The sign 140 shows arrows 142, 144, and 146 indicating which side of the road the user should travel on when approaching the roundabout. If specific lanes need to be used, the user interface 20 can also provide specific lane information to the user as well. Additionally, a notice 148 having a text description is provided which states, "Slow down and yield to traffic already in traffic circle (roundabout) ." Therefore, the user can be reminded of traffic rules pertaining to a roundabout or any other non-typical intersection.

The portable electronic device 10 of the present invention may be any device that is capable of providing navigation instructions to a user. For instance, the portable electronic device 10 can be a personal navigation device (PND), a mobile phone, a personal digital assistant (PDA), or other similar devices that have at least a position receiving device such as the GPS receiver 14 and a map database.

In summary the present invention provides intersection assistance for reminding users of the traffic rules pertaining to the current geographical location where the user is located. In this way, the user can travel through traffic intersections more safely, while also causing fewer hindrances for other drivers on the road. In this way, intersection assistance can not only be customized according to the geographical location where the user is located, but intersection assistance can also be customized according to the characteristics of specific types of traffic intersections encountered by the user of the portable electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of providing intersection assistance with a portable electronic device to remind a user of traffic rules when the user approaches traffic intersections, the method comprising:

receiving an input from the user indicating a destination location for generating navigation instructions to the destination location;

determining, by a processor, a current location of the portable electronic device according to received position signals;

providing navigation instructions to the destination location with the portable electronic device according to the current location of the portable electronic device; and reminding the user of traffic rules related to intersections for a geographical location in which the portable electronic device is currently located when the portable electronic device detects that the portable electronic device is approaching an intersection, wherein reminding the user of traffic rules related to intersections comprises indicating a side of a second road the user should turn onto when making a turn from a first road onto the second road, and indicating a lane of the indicated side of the second road the user should turn onto when making the turn from the first road onto the second road.

2. The method of claim 1, wherein reminding the user of traffic rules related to intersections comprises indicating whether turning is permitted while a road that the user is traveling on has a red traffic light signaling the user to stop.

3. The method of claim 1, wherein reminding the user of traffic rules related to intersections comprises indicating the traffic rules governing which vehicle should go first when the user approaches an intersection having a four-way stop.

4. The method of claim 1, wherein reminding the user of traffic rules related to intersections comprises indicating which side of a road the user should travel on when approaching a roundabout or traffic circle.

5. The method of claim 1, wherein reminding the user of traffic rules related to intersections comprises indicating which lane of the first road the user should travel on when approaching a non-typical intersection and indicating which side and which lane of the second road the user should turn onto when making a turn from the first road onto the second road.

6. The method of claim 1, wherein the traffic rules correspond to a particular country or region related to the geographical location in which the portable electronic device is currently located.

7. The method of claim 1, further comprising displaying on a display of the portable electronic device a symbol providing a visual clue to the user regarding a driving maneuver needed at an upcoming intersection.

8. The method of claim 1, further comprising displaying on a display of the portable electronic device a notice containing a text description for explaining traffic rules related to an upcoming intersection.

9. A portable electronic device for providing intersection assistance with a portable electronic device to remind a user of traffic rules when the user approaches traffic intersections, the portable electronic device comprising:

- a position receiving device receiving position signals indicating a current location of the portable electronic device;
- a map database for storing map data including road information;
- route software for receiving a destination location from the user and providing navigation instructions to the destination location with the portable electronic device according to the current location of the portable electronic device; and
- a user interface for reminding the user of traffic rules related to intersections for a geographical location in which the portable electronic device is currently located when the portable electronic device detects that the portable electronic device is approaching an intersection, wherein the user interface reminds the user of traffic rules related to intersections by indicating a side of a second road the user should turn onto when making a turn from a first road onto the second road, and the user interface reminds the user of traffic rules related to intersections by indicating a lane of the indicated side of the second road the user should turn onto when making the turn from the first road onto the second road.

10. The portable electronic device of claim 9, wherein the user interface reminds the user of traffic rules related to intersections by indicating whether turning is permitted while a road that the user is traveling on has a red traffic light signaling the user to stop.

11. The portable electronic device of claim 9, wherein the user interface reminds the user of traffic rules related to intersections by indicating the traffic rules governing which vehicle should go first when the user approaches an intersection having a four-way stop.

12. The portable electronic device of claim 9, wherein the user interface reminds the user of traffic rules related to intersections by indicating which side of a road the user should travel on when approaching a roundabout or traffic circle.

13. The portable electronic device of claim 9, wherein the user interface reminds the user of traffic rules related to intersections by indicating which lane of the first road the user should travel on when approaching a non-typical intersection and indicating which side and which lane of the second road the user should turn onto when making a turn from the first road onto the second road.

14. The portable electronic device of claim 9, wherein the traffic rules correspond to a particular country or region related to the geographical location in which the portable electronic device is currently located.

15. The portable electronic device of claim 9, wherein the user interface displays on a display of the portable electronic device a symbol providing a visual clue to the user regarding a driving maneuver needed at an upcoming intersection.

16. The portable electronic device of claim 9, wherein the user interface displays on a display of the portable electronic device a notice containing a text description for explaining traffic rules related to an upcoming intersection.

* * * * *